United States Patent [19]

Huttlin

[11] 4,444,810
[45] Apr. 24, 1984

[54] APPARATUS FOR TREATING GRANULAR MATERIAL BY DRYING, FILM-COATING OR COATING

[76] Inventor: Herbert Huttlin, Lörracher Strasse 14, D-7853 Steinen, Fed. Rep. of Germany

[21] Appl. No.: 398,081

[22] Filed: Jul. 14, 1982

[30] Foreign Application Priority Data

Nov. 24, 1981 [DE] Fed. Rep. of Germany ....... 3146536

[51] Int. Cl.³ .............................................. B05D 7/00
[52] U.S. Cl. .................................... 427/212; 34/130; 34/134; 34/138; 34/140; 118/19; 118/20; 118/64; 118/303; 118/418; 427/240; 427/242
[58] Field of Search ................. 34/130, 140, 138, 134; 118/19, 418, 20, 303, 64; 427/240, 212, 242

[56] References Cited

U.S. PATENT DOCUMENTS

| | | | |
|---|---|---|---|
| 3,285,223 | 11/1966 | Sahlin | 427/242 |
| 3,302,608 | 2/1967 | Coons et al. | 118/19 |
| 3,874,092 | 4/1975 | Huttlin | 118/19 |
| 4,064,831 | 12/1977 | Okawara | 118/303 |
| 4,245,580 | 1/1981 | Okawara | 118/20 |

FOREIGN PATENT DOCUMENTS

2315882 2/1975 Fed. Rep. of Germany .

Primary Examiner—Michael R. Lusignan
Assistant Examiner—Janyce A. Bell
Attorney, Agent, or Firm—Brumbaugh, Graves, Donohue & Raymond

[57] ABSTRACT

In a drum which is rotatable about a horizontal axis of rotation, inlet and outlet lines for a gas, for drying a material contained in the drum, are connected to an immersion body. The immersion body has inlet and outlet openings for the gas and is disposed within the drum to be immersed in the material. The immersion body contains a tunnel through which the material can flow and has arranged in its interior at least some of the inlet and outlet openings for the gas.

20 Claims, 6 Drawing Figures

APPARATUS FOR TREATING GRANULAR MATERIAL BY DRYING, FILM-COATING OR COATING

BACKGROUND OF THE INVENTION

The invention relates to an apparatus for treating granular material by drying, film-coating or coating, of the type including a drum which is rotatable about an at least approximately horizontal axis of rotation. The drum is formed with a shell and an end wall portion on either side thereof for containing the material. Inlet and outlet pipes supply a gas, for drying the material, to an immersion body, which has inlet and outlet openings connected to the inlet and outlet pipes. The immersion body is disposed within the drum and assumes a position in which it is immersed in the material.

For the purpose of the invention, granular material will be understood to mean primarily granules and pellets, but also crystalline bodies as are used to make pellets, and the like.

In a known apparatus of the described kind (DE-PS No. 23 15 882), the immersion body has the shape of a ship, its surfaces corresponding to the hull of the ship being provided with inlet openings and its surface corresponding to the deck of the ship being provided with outlet openings for the gas to dry the material. When the drum rotates and consequently the particles of material at the bottom are entrained in the direction of rotation and flow back at the top, this flow of material is divided by the ship-like immersion body and is subjected to the intensive passage of drying gas. However this passage of drying gas reaches only those particles of the material which move past the immersion body or close by it. In a larger drum therefore two or more of such known immersion bodies have to be placed side by side, yet even then considerable amounts of energy are consumed until the material is uniformly dried.

In this known apparatus, if the material is to be coated, a liquid or pulpy medium such as sugar solution or the like is generally sprayed onto the material at a distance in front of the ship-like immersion body. By circulating and drying the material, uniform coatings are then to be formed on the separate particles of the material. The medium serves simultaneously for wetting and for coating, and is consequently tacky, so that it is difficult to prevent particles thereof from settling on the inside walls of the drum and adhering there in regions which fail to or hardly come into contact with the flow of material.

SUMMARY OF THE INVENTION

The present invention is an apparatus for treating granular material in which the gas for drying and optionally the matter for coating the material are utilized better and in so doing the danger of fouling of the drum is reduced.

According to the invention, an immersion body is provided in the form of a tunnel through which the material can flow and has arranged in its interior at least some of the inlet and outlet openings for the gas, so that the drying gas efficiently circulates through the falling granular material.

It is thereby achieved that the material does not flow past the immersion body, as hitherto, but flows through it and is subjected inside it to the passage of drying gas. Thus the energy contained in the drying gas is utilized better than was hitherto possible. Substances, with which the material is optionally wetted and/or coated, are drawn into or held in the flow of material while the material is dried in the interior of the tunnel-like immersion body, i.e., the coated material is dried prior to leaving the tunnel. Consequently the possibilities for such substances to settle on the inside wall of the drum are considerably reduced.

The design given according to the invention to the immersion body is to especial advantage with a drum whose end wall portions extend at least approximately frustum-shaped into the space enclosed by the shell, as per U.S. application Ser. No. 398,082, filed concurrently herewith (German patent application No. P 31 30 166.5), the disclosure of which is incorporated herein. When the end wall portions are of this design, the material entrained upwards by the drum as it rotates not only spills down over the material lying underneath it, but also over and away from the inwardly projecting end wall portions. Therefore the entire flow of the material spilling down like cascades is concentrated in a narrowed region of the drum and a considerable part of it flows through the immersion body disposed therein.

In a preferred embodiment of the invention, the immersion body has at its forward end exposed to the flow of material an inside width which is 75 to 95% of the smallest axial distance between the end wall portions of the drum. If and when the drum has inwardly-projecting end wall portions as per German patent application No. P 31 30 166.5, this dimension of the inside width at the front side of the tunnel-like immersion body is sufficient for almost the entire downwardly directed flow of material to be passed through the immersion body. At the same time, however, contact between drum (which rotates) and the immersion body (which is stationary) can be prevented without special care.

It is expedient if the immersion body has at its forward end at least one additional inlet opening for the gas to dry the material, or for any other gas. Such gas is directed against the falling material to prevent a hard impact of such material against the immersion body at the mouth of the tunnel and/or so that the material can be fluidized.

Independently of or in addition to this, the immersion body can have at its forward end a sharp inlet edge obstructing the flow of material as little as possible.

The immersion body preferably has at its rear portion a smaller inside width than at its front. Thereby the flow of material inside the tunnel-like immersion body is accelerated and further thorough mixing is achieved.

It is expedient if the immersion body has a rectangular cross section in a plane which contains the axis of rotation of the drum and is perpendicular to the direction of flow of the material. Such an immersion body is on the one hand easy to produce and on the other hand lends itself particularly well to cooperating with inwardly-projecting end wall portions of the drum according to German patent application No. P 31 30 166.5.

It is further expedient if the immersion body has in its interior an intermediate floor in which inlet openings for the gas are formed and the immersion body furthermore has in its interior an intermediate ceiling in which outlet openings for the gas are formed. The immersion body could however also be a simple tube, for instance, of rectangular or circular cross section, into which the inlet and outlet pipes for the gas for drying the material are connected in a suitable manner.

In the design according to the invention of the tunnel-like immersion body with intermediate floor, inlet openings for introducing the gas are preferably formed in a rear zone of the intermediate floor. In front of them, at least one inlet opening for coating matter is arranged in the intermediate floor and is connected to a separate pipe for the coating matter.

It is further expedient if, in front of the at least one inlet opening for the coating matter, there is arranged in or in front of the immersion body at least one additional inlet opening or nozzle for a medium for wetting the material. This arrangement enables an aqueous or organic solvent without any adhesive properties of its own to be sprayed onto or introduced into the flow of material as a medium for wetting it. The coating matter is introduced into the flow of material only thereafter, in approximately the central zone of the tunnel-like immersion body. In this manner the danger of the drum becoming foul is virtually ruled out altogether, even if and when the material is not only dried but provided with a coating of adhesive coating matter. In addition, the possibility of the immersion body becoming foul is also kept extremely low.

It is expedient if the at least one nozzle or other inlet opening for the medium to wet the material is also arranged in the intermediate floor.

The apparatus according to the invention lends itself, inter alia, to various known methods of coating or film-coating, wherein coating matter is applied to the material as the drum rotates and is then dried. When such a method is performed according to the invention, the material is wetted with a non-adhesive, liquid or vaporous medium before the mouth to or in the front zone of the tunnel-like immersion body. The coating matter in powder form is introduced into the material in a central zone of the immersion body. It has proved that vaporous media settle particularly quickly on the separate particles of the material and uniformly wet them. Powdery, adhesive coating matter, which is then introduced separately, sticks virtually only to the wetted particles of the material, but not to the immersion body or to the drum. The material can hence be coated or film-coated in an especially clean manner and without almost any loss.

BRIEF DESCRIPTION OF THE DRAWINGS

Embodiments of a dragee-making apparatus according to the invention are described below with the aid of schematic drawings, in which.

DETAILED DESCRIPTION OF THE PREFERRED EMBODIMENTS

Figure 1:
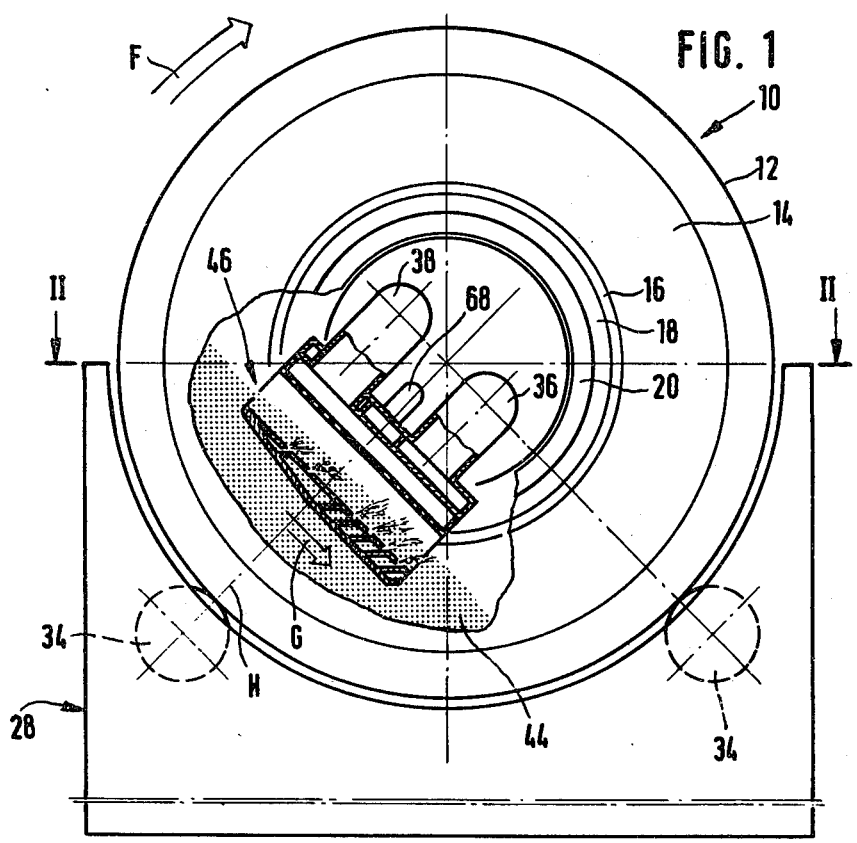
FIG. 1 is a side view of an apparatus according to the invention, partly in a vertical section, taken along the line I—I of FIG. 2.
Figure 2:
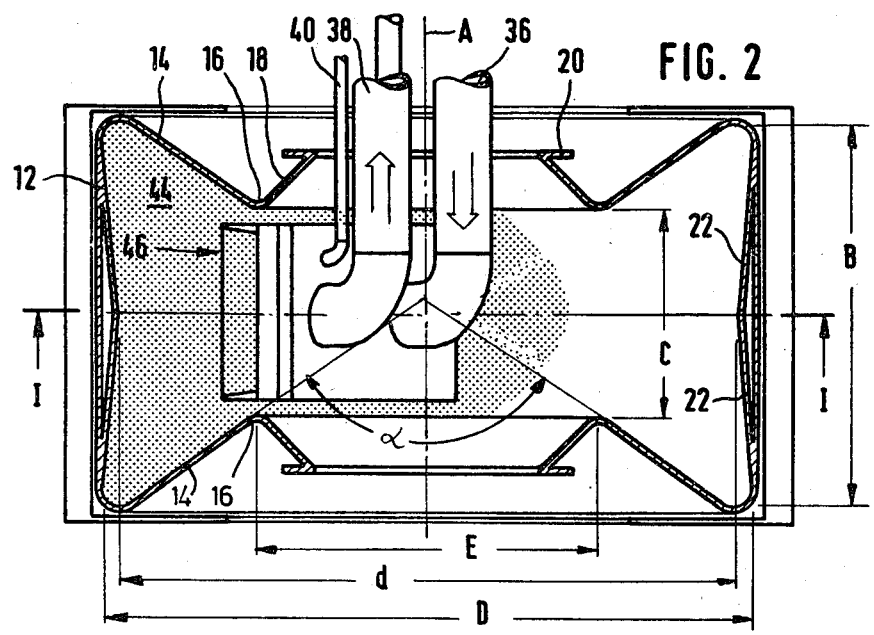
FIG. 2 is a horizontal section taken along the line II—II of FIG. 1.

FIGS. 1 and 2 illustrate a drum 10, which is rotatable about a horizontal axis of rotation A. The drum 10 has a shell 12 and two axially spaced, ring-like, frustum shaped end wall portions 14 arranged at opposite ends of the shell 12. The shell has an axial length B and a maximum inside diameter D. The two end wall portions 14 each end in an annular zone 16 coaxial with the axis of rotation A. The said two annular zones are spaced apart from one another at an axial direction C which is considerably smaller than the axial length B of the shell 2. According to FIG. 2, the distance C is hardly more than half as large as the width B, and the dimeter E of the annular zones 16 is approximately half as large as the maximum inside diameter D of the shell 12.

According to FIG. 2, the cone angle $\alpha$ of the end wall portions 14 is approximately 100°. The two annular zones 16 are each adjoined by an end portion 18 which tapers frustum-shaped axially towards the outside and terminates in a flange 20.

The shell 12 has its maximum inside diameter D in the region of the transitions to the end wall portions 14 and narrows from either side to the minimum inside diameter d in the median plane, perpendicular to the axis of rotation A, of the drum 10. In the illustrated example, the reduction in diameter is approximately 5% of D and is achieved by the shell 12 having two frustum-shaped shell parts 22 tapering symmetrically towards the median plane.

According to FIGS. 1 and 2, the drum 10 is mounted on a roller block 28 having rollers 34 adapted to be rotary driven and arranged in pairs. The rollers 34 are devised such that they not only support the dragee-making drum 10 in a radial direction but also guide it in an axial direction. This does not necessitate that the shell 12 is enclosed in the usual way by ring-like rails, because the frustum-shaped, inwardly-drawn end wall portions 14 reinforce the shell 12 at its two edges such that they can directly take up the supporting forces transferred by the rollers 34.

Figure 3:
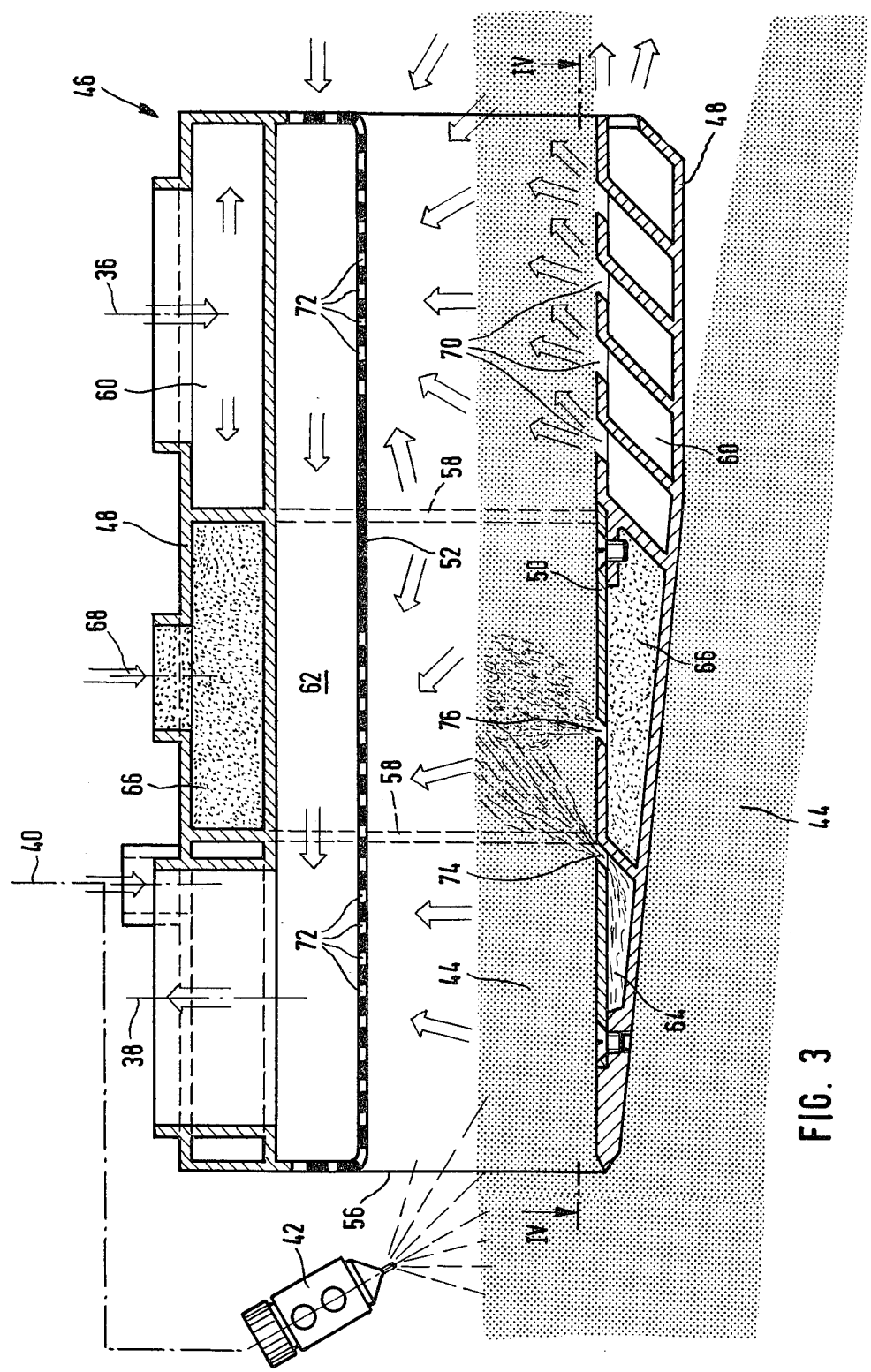
FIG. 3 is an enlarged detail from FIG. 1.

According to FIGS. 1 and 2, an inlet fluid delivery line 36, an outlet fluid line 38 and a fluid line 40 for a wetting medium extend parallel to the axis of rotation A into the drum 10. In the illustrated example, the fluid passage lines are pipes, and can thus also function to support the immersion body within the drum. The line 40 ends in a plurality of nozzles 42 arranged within the drum 10 in a line parallel to the axis of rotation A. A possible arrangement of such a nozzle is shown in FIG. 3. Wetting medium discharged from the nozzle 42 is sprayed from above onto the upper layer of a material 44, while the drum 10, which rotates in the direction of the arrow F in FIG. 1, entrains the lower layer of the material 44 upwards in the direction of rotation and causes the upper layer of the material to flow downwards in the direction of arrow G at an angle of about 45° to the horizontal.

A tunnel-like immersion body 46 is immersed into this upper layer of material 44 flowing downwards. According to FIG. 1, the longitudinal direction of the immersion body is inclined to the horizontal at the same angle of about 45° as the surface of the material 44 flowing downwards. The immersion body 46 has an outer wall 48 in the form of a jacket whose cross section is rectangular in a plane defined by line H and line A, and is perpendicular to the direction of flow G of the material. The substantially cuboid space enclosed by the outer wall 48 is subdivided by an intermediate floor 50 and an intermediate ceiling 52, each lying in a plane perpendicular to the plane defined by lines H and A, between two intermediate walls 54 arranged perpendicular to the axis of rotation A.

The outer wall 48 forms, together with the intermediate floor 50 and the two intermediate walls 54, a sharp inlet edge 56 at the beginning of the immersion body 46, which is at the top left in FIG. 1. The annulus between the outer wall 48 on the one hand and the intermediate floor 50, the intermediate ceiling 52, and the intermediate walls 54 on the other hand, is subdivided by two partitions 58 arranged perpendicular to said walls and floors. This subdivision is made into a ring-like inlet chamber 60 for the incoming drying gas, a flat outlet chamber 62 for the outgoing drying gas, a ring-like inlet chamber 64 for a wetting medium, and a ring-like inlet chamber 66 for coating matter. The two intermediate walls 54 converge in the direction of flow G. The tunnel-like immersion body 46 therefore has its interior, which is defined by the two intermediate walls 54 and through which the material 44 flows, narrowing in the direction of flow G.

In the illustrated example (see FIG. 4), the immersion body 46 has at its inlet edge 56, through which the material 44 flows, an inside width $W_1$ which is approximately 85% of the distance C between the annular zones 16. The immersion body 46 has at its back, i.e. where the material 44 exits, an inside width $W_2$ which is approximately 80% of $W_1$. Due to the intermediate floor 50 and the intermediate ceiling 52 being arranged parallel to one another, the inside cross section of the tunnel formed by the immersion body 46 hence decreases from the front to the rear by about 20% based on the inlet cross section bounded by the inlet edge 56.

The inlet chamber 60 for the gas for drying the material 44 is connected to the inlet line 36, and the outlet chamber 62 is connected to the outlet line 38. The inlet chamber 64 for the wetting medium can be connected to the line 40, in which case the nozzles 42 can be shut off or omitted altogether. Finally, the inlet chamber 66 can be connected to a line 68 for powdery coating matter.

The intermediate floor 50 has in its rear zone slit-like inlet openings 70 extending over its entire width and clearing the way for the drying gas from the inlet chamber 60 into the interior of the tunnel formed by the immersion body 46. Corresponding inlet openings can also be formed in the intermediate walls 54. Outlet openings 72 are provided on the entire length and width of the intermediate ceiling 52 and also on the front and rear face of the immersion body 46, the drying gas reaching the outlet chamber 62 through them.

The intermediate floor 50 has in the region of the ring-like inlet chamber 64, i.e. in the front region of the former, a slit-like inlet opening 74 extending over its entire width for the medium for wetting the material 44. Finally, a likewise slit-like inlet opening 76 for the coating matter is formed in the central region of the intermediate floor 50 and extends over its entire width.

Figure 4:
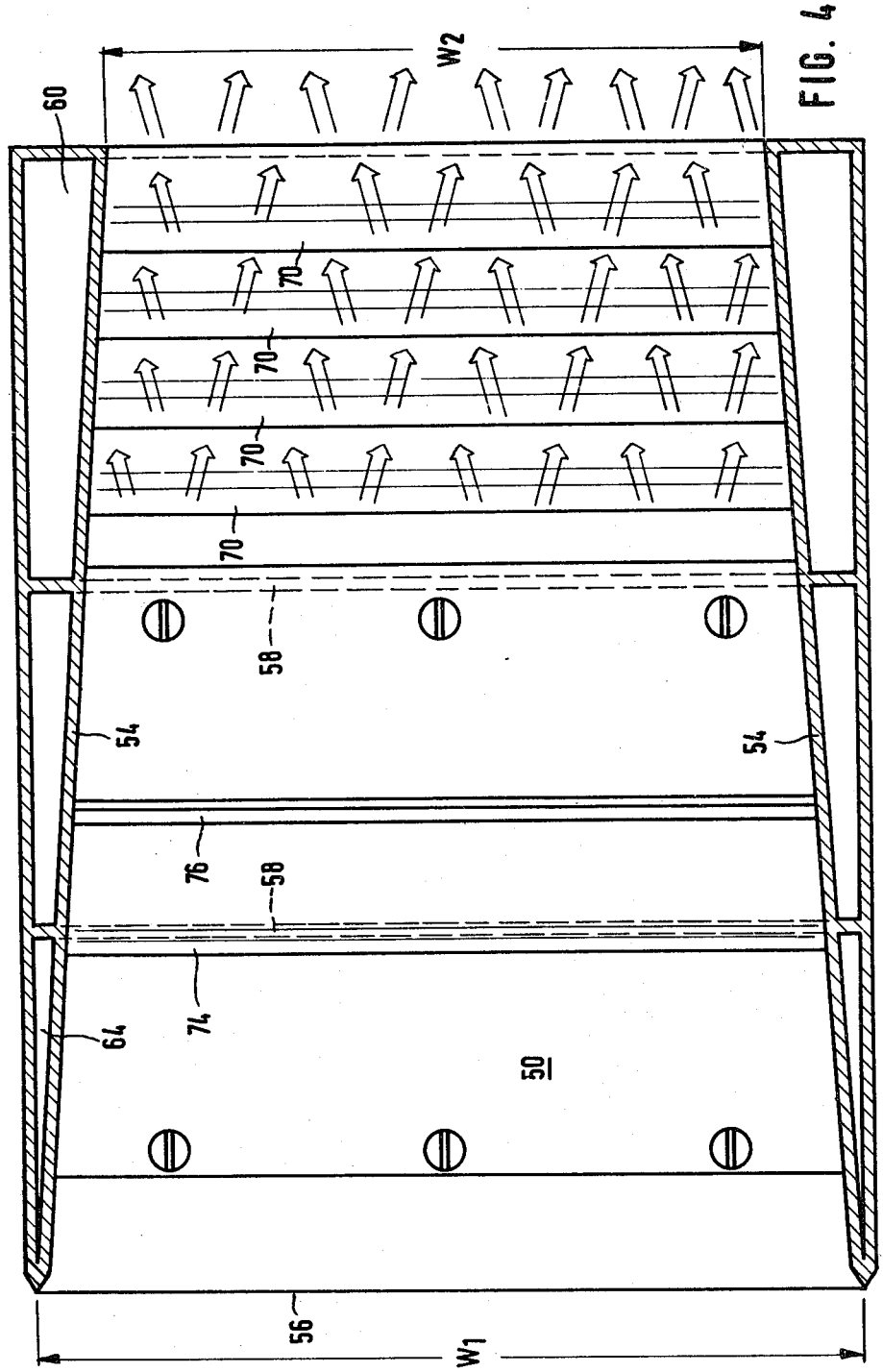
FIG. 4 is a section taken along the line IV—IV of FIG. 3.
Figure 5:
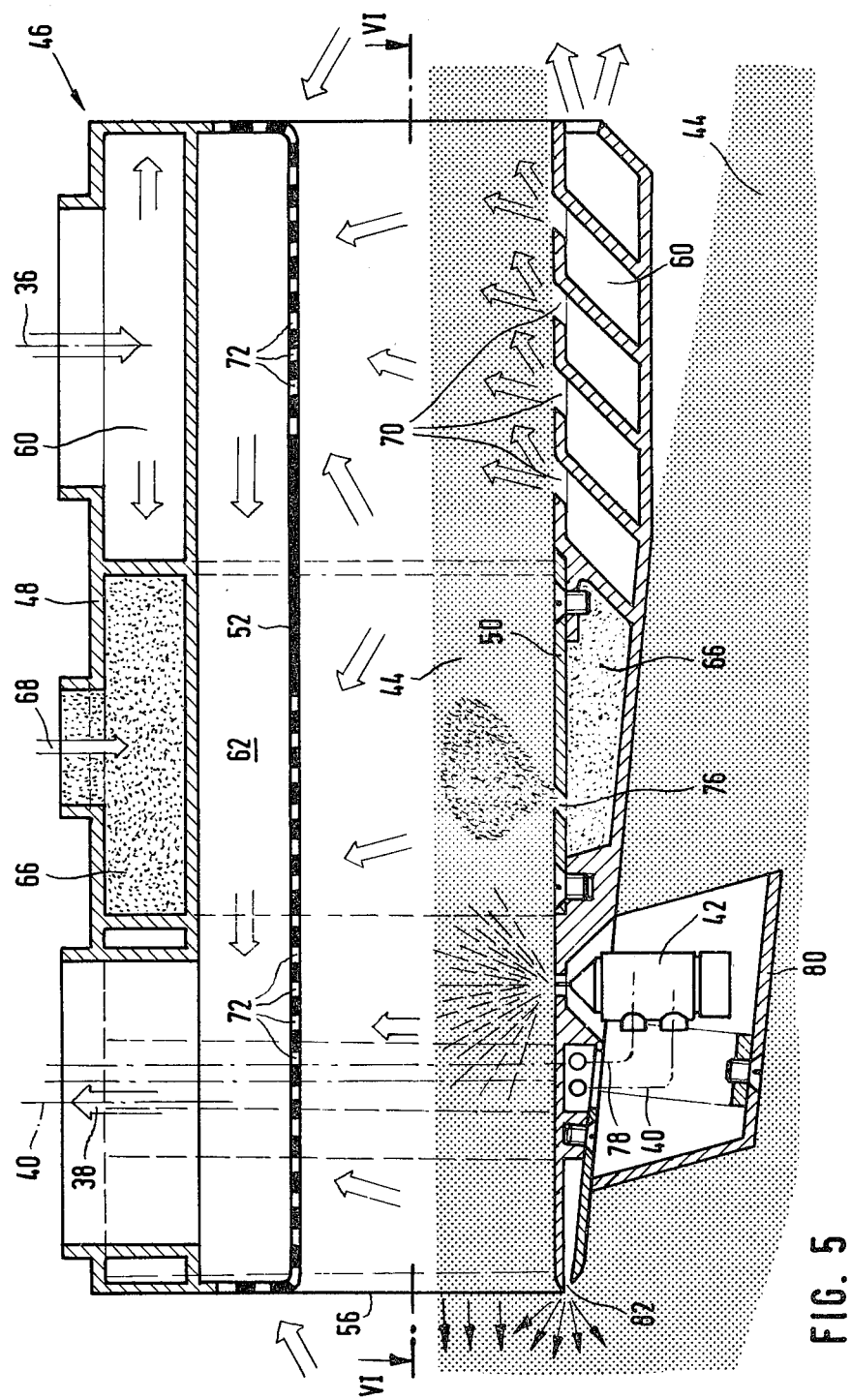
FIG. 5 is a vertical section, corresponding to FIG. 3, of a modified embodiment.
Figure 6:
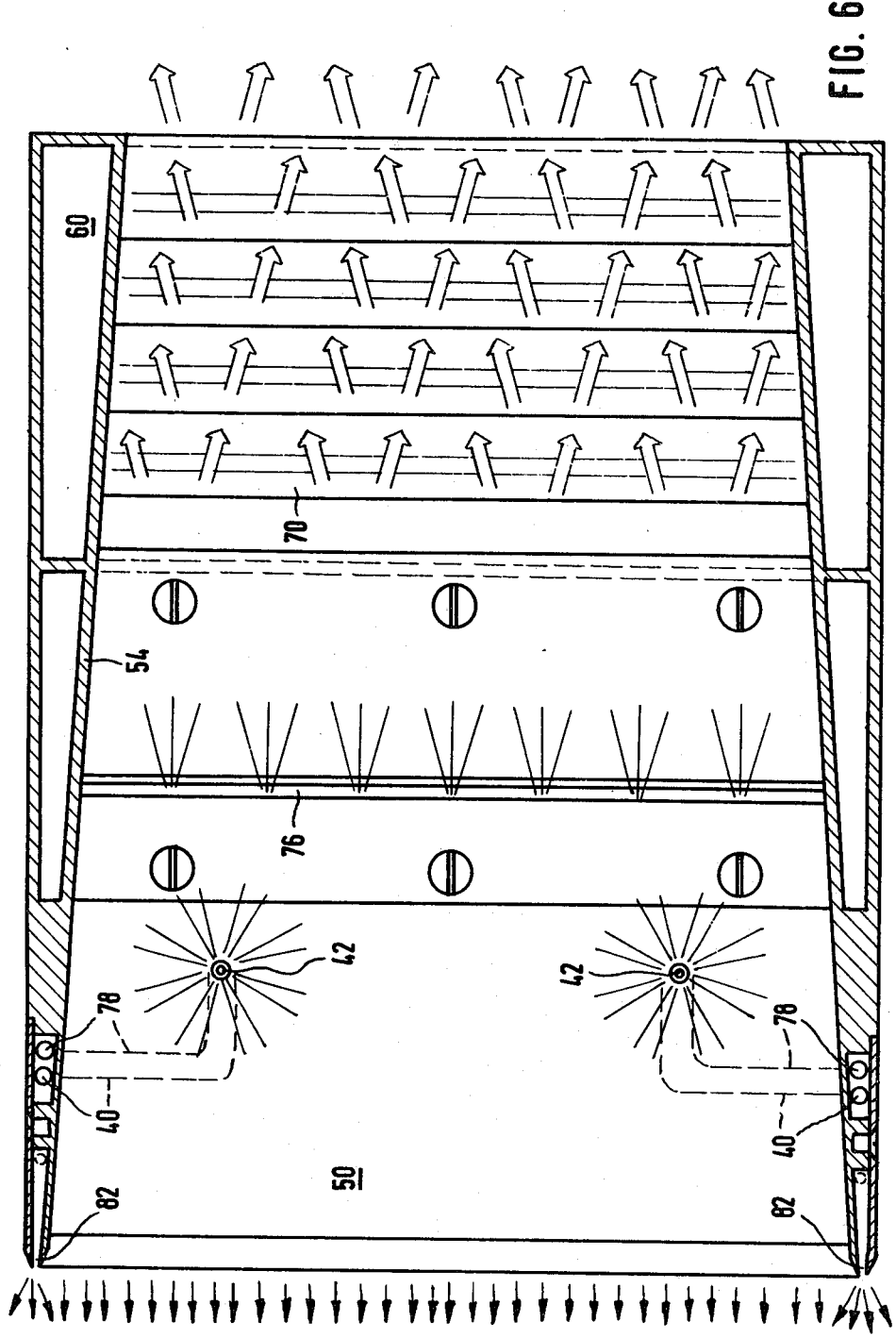
FIG. 6 is a section taken along the line VI—VI of FIG. 5.

Instead of the slit-like inlet opening 74 for the medium for wetting the material 44, as is illustrated in FIGS. 3 and 4, nozzles 42 directed upwards can be arranged on the underside of the immersion body 46, as in FIGS. 5 and 6. Such nozzles 42 correspond to the nozzle 42 shown in FIG. 3. They can take the form of two-component nozzles like the latter and are in this case connected to the line 40 for the wetting medium and additionally to a pressure gas pipe 78. According to FIG. 5, each of the nozzles 42, arranged on the underside of the immersion body 46, is shielded against the material 44 flowing past by a covering 80 shaped similarly to the bow of a ship.

Irrespective of whether and how a wetting medium is introduced into the material 44, an additional inlet opening 82 for pressure gas can be arranged at the front of the immersion body 46, in particular at the sharp inlet edge 56 thereof. According to FIGS. 5 and 6, this additional inlet opening 82 is slit-like. It extends along the entire inlet edge 56, which is U-shaped seen from the front, and is connected to the inlet chamber 60 for the gas for drying the material 44. The gas flowing out of the additional inlet opening 82 prevents the material 44 from impacting against the inlet edge 56 and thereby becoming damaged. Depending on the strength and direction of the gas flow issuing from the inlet opening 82, it can fluidize the material 44 at the mouth to the interior of the immersion body 46 and the material 44 may maintain a fluidized state throughout its movement through the immersion body 46.

Irrespective of whether or not such fluidization takes place, the immersion body 46 is preferably immersed in the material 44 only so far that the latter normally does not contact the intermediate ceiling 52, as per FIGS. 1, 3 and 5.

In the illustrated examples, a solvent vapour, e.g. isopropanol having an evaporation temperature of 79° C., is provided as medium for wetting the material 44. This vapour is sprayed by the nozzles 42 onto the material 44 just in front of the immersion body 46 and/or is introduced into the material 44 from underneath through the inlet opening 74 in the front zone of the tunnel interior. Downstream of this, powdery coating matter containing an adhesive is blown into the material 44 from underneath through the inlet opening 76, so that it rapidly deposits on the previously wetted particles of the material. In the last third of the tunnel-like immersion body 46, the material 44 is dried by warm air which is blown as drying gas into the material through the inlet openings 70.

The foregoing are representative of the preferred embodiments of the invention. Variations and modifications of the preferred embodiments will be apparent to persons skilled in the art without departing from the inventive concepts disclosed herein. All such modifications and variations are intended to be within the scope of the invention as defined in the following claims.

I claim:

1. Apparatus for treating granular material by drying, film-coating, or coating, comprising:
   a drum, which is rotatable about an at least approximately horizontal axis, having a shell and a pair of axially spaced end wall portions arranged at opposite ends of said shell;
   inlet and outlet lines for supplying and removing, respectively, a gas for drying the material; and
   an immersion body having a plurality of gas inlet and outlet openings communicating, respectively, with said inlet and outlet lines, said immersion body being disposed within said drum and arranged to be immersed in the granular material, and wherein said immersion body defines an interior portion containing at least some of said gas inlet and outlet openings, said interior portion including a tunnel through which the material can flow.

2. Apparatus as claimed in claim 1, wherein said immersion body has a forward end exposed to the inflow of material, and wherein said tunnel communicates with said forward end and has, at said forward end, an inside width which is approximately 75% to 95% of the smallest axial distance between said end wall portions.

3. Apparatus as claimed in claim 2, wherein said immersion body has at its forward end at least one said gas inlet opening.

4. Apparatus as claimed in claim 1, wherein said immersion body has a forward end with a sharp inlet edge.

5. Apparatus as claimed in claim 1, wherein said immersion body has a forward end and a rear portion, said tunnel communicating with said rear portion and having a smaller inside width than at said forward end.

6. Apparatus as claimed in claim 1, wherein said immersion body has a rectangular cross section in a plane which contains the axis of rotation of said drum and is perpendicular to the direction of flow of the material.

7. Apparatus as claimed in claim 1, wherein said immersion body has in said interior an intermediate floor, in which at least some of said gas inlet openings are arranged, and an intermediate ceiling, in which at least some of said gas outlet openings are arranged.

8. Apparatus as claimed in claim 7, comprising a second inlet line for supplying a coating material, wherein at least some of said gas inlet openings are formed in a rear zone of said intermediate floor, and wherein forward of said rear zone is arranged in said intermediate floor at least one second inlet opening for coating material communicating with said second inlet line.

9. Apparatus as claimed in claim 8, comprising a third inlet means for introducing a medium for wetting the material arranged forward of the at least one second inlet opening.

10. Apparatus as claimed in claim 9, wherein said third inlet means is arranged in said immersion body.

11. Apparatus as claimed in claim 10, wherein said third inlet means is arranged in said intermediate floor.

12. Apparatus as claimed in claim 9, wherein said third inlet means is arranged in front of said immersion body.

13. Apparatus as claimed in claim 9, 10, 11, or 12, wherein said third inlet means includes a nozzle.

14. Apparatus as claimed in claim 1, 2, 3, 4, 5, 6, 7, 8, or 9, wherein said shell portion defines a space, and wherein said end wall portions are at least approximately frustum-shaped and extend into said space.

15. A method of treating granular material in a drum which is rotatable about an at least approximately horizontal axis, said drum having a shell and a pair of axially spaced end wall portions adjoining opposite ends of said shell, and an immersion body disposed within said drum and arranged to be immersed in the granular material, wherein said immersion body defines an interior portion including a tunnel through which the material can flow, comprising the steps of:

rotating said drum for causing said material to enter a forward end of said immersion body and to flow through said tunnel;

supplying gas to, and removing gas from, said interior portion of the immersion body, through a plurality of gas inlet and outlet openings in said interior portion, for drying said material.

16. A method as defined in claim 15, comprising the step of supplying gas to a forward end of said immersion body through at least one gas inlet opening.

17. A method as defined in claim 15, wherein said tunnel is arranged between an intermediate floor and a intermediate ceiling in said interior, and wherein gas is supplied through inlet openings in said intermediate floor and removed through outlet openings in said intermediate ceiling.

18. A method as defined in claim 17, wherein said gas is supplied through inlets in a rear zone of said intermediate floor, and wherein forward of said rear zone is arranged in said intermediate floor at least one second inlet opening, and comprising the step of supplying a coating material through said second inlet opening for coating said granular material.

19. A method as defined in claim 18, comprising the step of introducing a medium for wetting the material, through at least one of a nozzle and a third inlet opening arranged in or in front of said immersion body.

20. A method as defined in claim 19, wherein said at least one nozzle or third inlet opening is arranged in said intermediate floor.

* * * * *